(12) United States Patent
Clay, Jr.

(10) Patent No.: US 9,833,703 B2
(45) Date of Patent: Dec. 5, 2017

(54) THERMOELECTRIC DEVICE IN GAME CONTROLLER

(71) Applicant: Sony Corporation, Tokyo (JP)

(72) Inventor: William J. Clay, Jr., San Diego, CA (US)

(73) Assignee: Sony Corporation, Tokyo (JP)

(*) Notice: Subject to any disclaimer, the term of this patent is extended or adjusted under 35 U.S.C. 154(b) by 146 days.

(21) Appl. No.: 14/799,331

(22) Filed: Jul. 14, 2015

(65) Prior Publication Data
US 2017/0014715 A1 Jan. 19, 2017

(51) Int. Cl.
*A63F 13/285* (2014.01)

(52) U.S. Cl.
CPC ................... *A63F 13/285* (2014.09)

(58) Field of Classification Search
CPC ...................................... A63F 13/285
See application file for complete search history.

(56) References Cited

U.S. PATENT DOCUMENTS

| | | | |
|---|---|---|---|
| 4,976,435 A * | 12/1990 | Shatford | A63B 24/0087 345/156 |
| 8,550,905 B2 | 10/2013 | Mikhailov | |
| 8,840,017 B2 | 9/2014 | Chan et al. | |
| 2006/0068917 A1* | 3/2006 | Snoddy | A63F 13/27 463/42 |
| 2007/0093292 A1 | 4/2007 | Naghi et al. | |
| 2012/0258800 A1* | 10/2012 | Mikhailov | G06F 3/016 463/37 |
| 2012/0302302 A1 | 11/2012 | Hamlin et al. | |
| 2013/0217491 A1 | 8/2013 | Hilbert et al. | |
| 2015/0077071 A1 | 3/2015 | Fleming | |
| 2016/0089601 A1* | 3/2016 | Terry | A63F 13/24 463/37 |

FOREIGN PATENT DOCUMENTS

EP 2348606 7/2011

* cited by examiner

*Primary Examiner* — William H McCulloch, Jr.
*Assistant Examiner* — Yingchuan Zhang
(74) *Attorney, Agent, or Firm* — John L. Rogitz (57) ABSTRACT

A thermoelectric device (TED) is coupled to a portable game controller such that the TED can be used in coordination with video game events to heat or cool the game controller to add realism. Or, the TED can be used to transform heat from a player's body into electricity to charge the battery of the game controller.

20 Claims, 5 Drawing Sheets

Control by console game

FIG. 5

Console agnostic to thermoelectric device

Thermoelectric tiles can be placed at any contact point between the user and the game controller.

FIG. 8

THERMOELECTRIC DEVICE IN GAME CONTROLLER

TECHNICAL FIELD

The application relates generally to thermoelectric devices in game controllers.

BACKGROUND

An example computer ecosystem, or digital ecosystem, which is an adaptive and distributed socio-technical system that is characterized by its sustainability, self-organization, and scalability, that is pertinent to present principles is a computer game network in which a game console receives player signals from hand held game controllers and alters video game presentation based thereon.

SUMMARY

As understood herein, such hand-held game controllers may be configured to add realism to a computer game by heating up or cooling down based on game events. As also understood herein, game controllers, which are often battery-powered and wireless, may be recharged using the heat of a player's hands.

In an embodiment, disclosed is a computer memory that is not a transitory signal and that includes instructions executable by at least one processor to receive a gaming signal from a computer game component. Responsive to the gaming signal, the instructions are executable to actuate at least one thermoelectric device on at least one game controller to generate a tactile temperature signal on the game controller, with the game controller being configured for communication with at least one game console configured to present a computer game video on a display.

In some implementations, the game console may be integrated into the game controller, e.g., as in the PS-Vita system.

The game controller may be hand-held or worn on the body, e.g., the game controller may be a head-mounted display which has motion sensing devices which in effect provide control feedback from the user to the game console.

In example embodiments, the gaming signal is generated by user manipulation of at least one control element on the game controller. Or, the gaming signal can be received from the game console. In this case, the gaming signal from the game console may include a command to the game controller to actuate the thermoelectric device. Alternatively, the gaming signal from the game console is not a command to actuate the thermoelectric device, and the instructions are executable to determine whether the gaming signal correlates to at least one game event signal for which it has been determined a tactile temperature signal should be generated. Responsive to determining that the gaming signal is a game event signal for which it has been determined a tactile temperature signal should be generated, the instructions are executable to actuate the thermoelectric device to generate the tactile temperature signal on the game controller, and otherwise not to actuate the thermoelectric device to generate the tactile temperature signal on the game controller.

The tactile temperature signal can be an increase of surface temperature on at least a portion of the game controller. Or, the tactile temperature signal can be a decrease of surface temperature on at least a portion of the game controller.

If desired, the thermoelectric device can be a Seebeck-Peltier thermoelectric device.

In another aspect, a game controller has a portable housing, at least one processor in the housing, and at least one transceiver in the housing configured for communication with at least one video game console such that user input on the game controller is sent to the video game controller to control a computer game video. At least one thermoelectric device is on the housing for transforming heat into an electrical signal, and/or transforming an electrical signal into heat.

In another aspect, a method includes receiving a gaming signal from a computer game component, and responsive to the gaming signal, actuating at least one thermoelectric device on at least one portable game controller to generate a tactile temperature signal on the game controller. The game controller is configured for communication with at least one game console configured to present a computer game video on a display.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Figure 1:
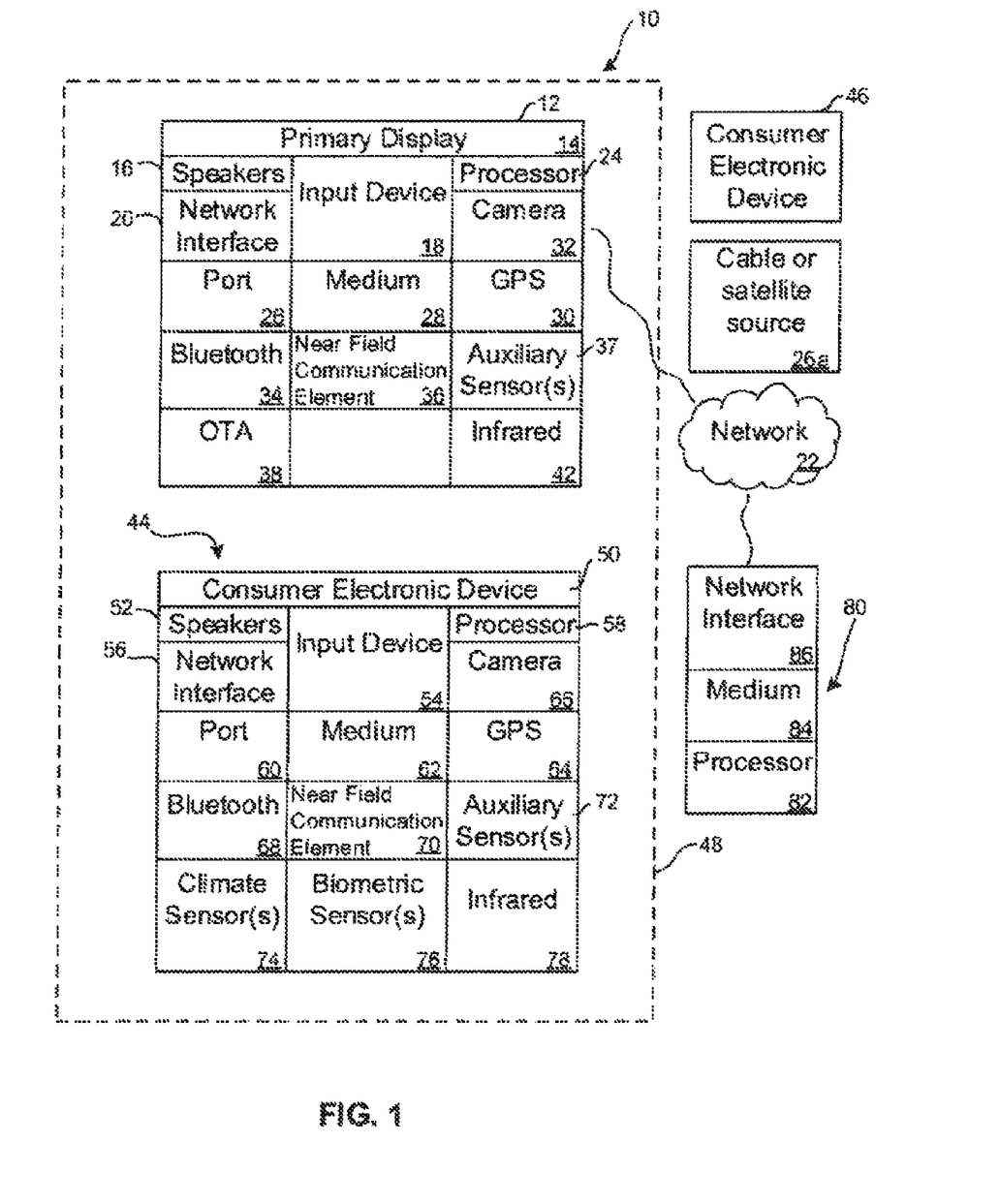
FIG. 1 is a block diagram of an example system including an example in accordance with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid state storage that are not transitory signals, in some cases embodied in the chassis of the AVDD as standalone devices or as a personal video recording device (PVR) or video disk player either internal or external to the chassis of the AVDD for playing back AV programs or as removable memory media. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a game controller communicating via wired or wireless link with a game console implemented by the second CE device 46 and controlling video game presentation on the AVDD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
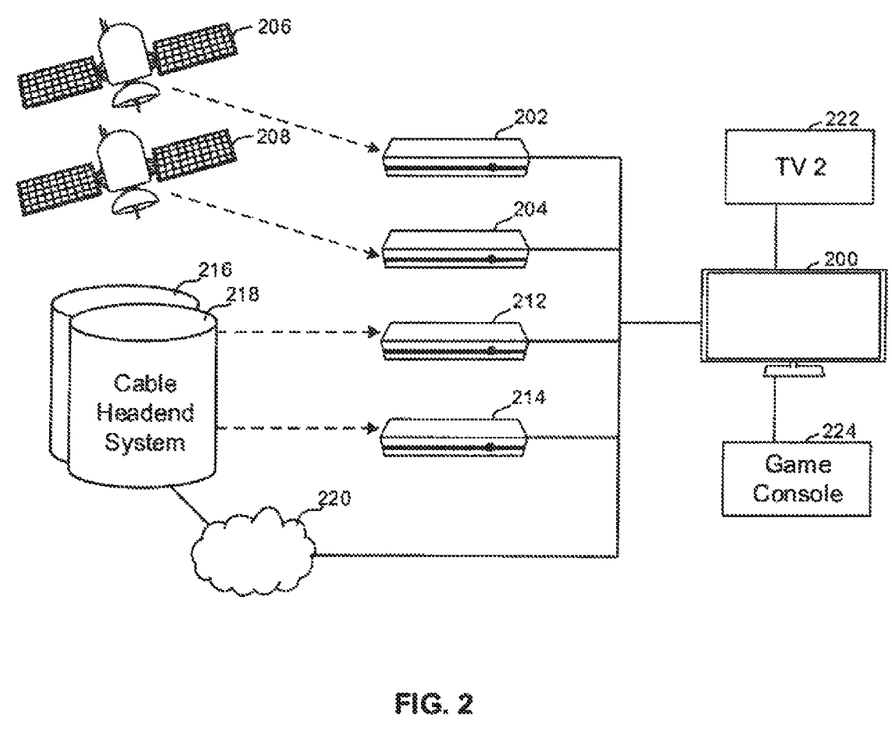
FIG. 2 is a block diagram of another system that can use the components of FIG. 1.

Now referring to FIG. 2, an AVDD 200 that may incorporate some or all of the components of the AVDD 12 in FIG. 1 is connected to at least one gateway for receiving content, e.g., UHD content such as 4K or 8K content, from the gateway. In the example shown, the AVDD 200 is connected to first and second satellite gateways 202, 204, each of which may be configured as a satellite TV set top box for receiving satellite TV signals from respective satellite systems 206, 208 of respective satellite TV providers.

In addition or in lieu of satellite gateways, the AVDD 200 may receive content from one or more cable TV set top box-type gateways 210, 212, each of which receives content front a respective cable head end 214, 216.

Yet again, instead of set-top box like gateways, the AVDD 200 may receive content from a cloud-based gateway 220. The cloud-based gateway 220 may reside in a network interface device that is local to the AVDD 200 (e.g., a modem of the AVDD 200) or it may reside in a remote Internet server that sends Internet-sourced content to the AVDD 200. In any case, the AVDD 200 may receive multimedia content such as UHD content from the Internet through the cloud-based gateway 220. The gateways are computerized and thus may include appropriate components of any of the CE devices shown in FIG. 1.

In some embodiments, only a single set top box-type gateway may be provided using. e.g., the present assignee's remote viewing user interface (RVU) technology.

Tertiary devices may be connected, e.g., via Ethernet or universal serial bus (USB) or WiFi or other wired or wireless protocol to the AVDD 200 in a home network (that may be a mesh-type network) to receive content from the AVDD 200 according to principles herein. In the non-limiting example shown, a second TV 222 is connected to the AVDD 200 to receive content therefrom, as is a video game console 224. Additional devices may be connected to one or more tertiary devices to expand the network. The tertiary devices may include appropriate components of any of the CE devices shown in FIG. 1.

Figure 3:
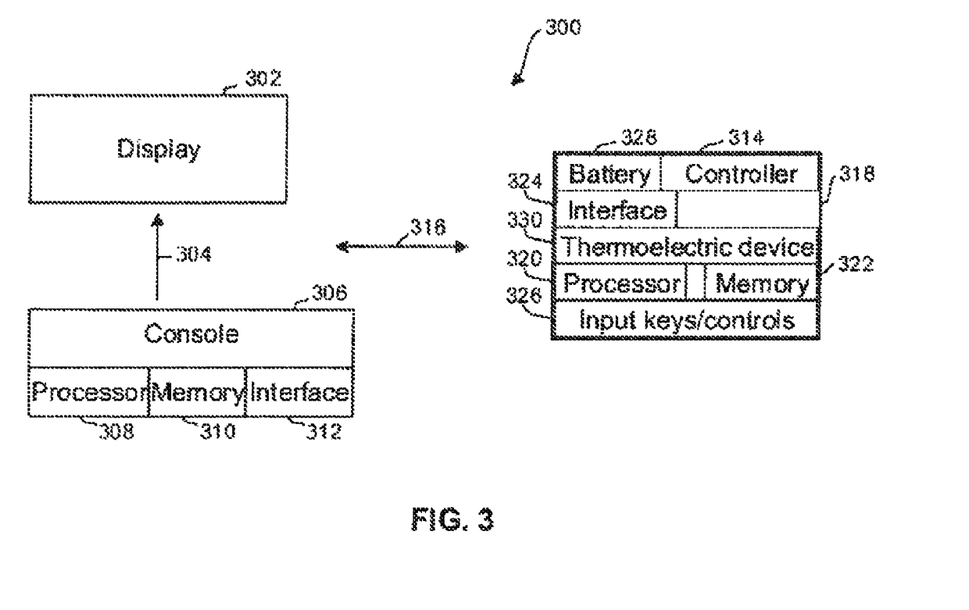
FIG. 3 is a block diagram of an example gaming system.

FIG. 3 shows a gaming system 300 including a display device 302 that may be implemented by, e.g., the AVDD 12 in FIG. 1 AVDD 200 in FIG. 2. The display device 300 communicates via a wired and/or wireless link 304 with a game console 306, which may be implemented, as non-limiting examples, by the source 26a in FIG. 1, the first CE device 44, the game console 224 in FIG. 2, or the below-described game controller itself. The game console 306 may be integrated into the display device 302 if desired. In any case, the game console 306 typically includes one or more processors 308 accessing one or more computer memories 310 and communicating via one or more communication interfaces 312 with other components. The interface 312 may be any appropriate communication interface such as any of the interfaces, where appropriate, discussed above.

A game controller 314 communicates with the game console 306 via an aired and/or wireless link 316. The game controller may be body-borne including a hand-holdable device. Accordingly, the game controller includes a lightweight hollow housing 318 that can be hand-held. The game controller 314 may physically take on any desired external configuration, such as but not limited to a rectilinear block (FIG. 7) or a toy rifle (FIG. 8) or a head-worn system which uses motion sensor signals as input to the game console to control the video game graphics.

The game controller 314 may incorporate one or more of the components of, e.g., the CE device 46 discussed above, and thus may include one or more processors 320 accessing one or more computer memories 322 and communicating via one or more communication interfaces 324 with other components in the system 300. The interface 324 may be any appropriate communication interface such as any of the interfaces, where appropriate, discussed above.

Also, the game controller may include gaming input elements 326 such as keys, including directional keys and "shoot" keys and the like. The game controller 314 may be powered by one or more batteries 328 which preferably can be recharged.

As shown in FIG. 3, one or more thermoelectric devices (TED) 330 are mounted on the housing 318 of the game controller 314. The TED 330 may be, for example, a Seebeck-Peltier thermoelectric device. The TED 330 is preferably mounted on or close enough to the surface of the housing 318 that any heat or cold it generates can be tactilely detected by a person bearing the housing. By supplying control electricity using a first polarity to the TED, the TED can be made to generate heat. By reversing the polarity, the TED is made to generate cold, i.e., to cool. By tapping electricity generated by the TED when a player's hands heat the TED when no control electricity is being supplied to the TED, electricity generated by the TED from the heat of the person's body can be used to recharge the battery 328.

Figure 4:
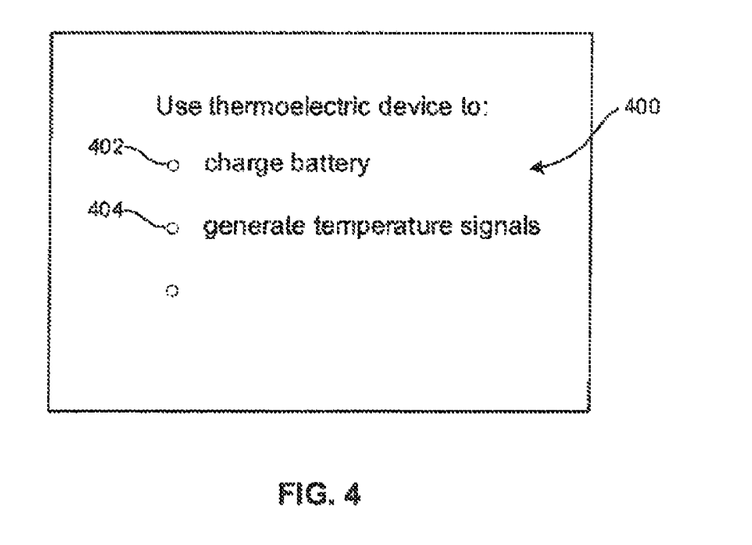
FIG. 4 is a screen shot of an example user interface (UI) to configure thermoelectric device (TED) operation.

FIG. 4 illustrates giving a user the option of using the TED 300 for tactile signal generation or battery charging. A user interface (UI) 400 may be presented on a display 402 such as the display of the AVDD under control of the game console to select, at 402, to charge the battery 328. A selector 404 may be selected by a user to select to use the TED 330 to generate tactile gaming signals that are temperature-based.

Figure 5:
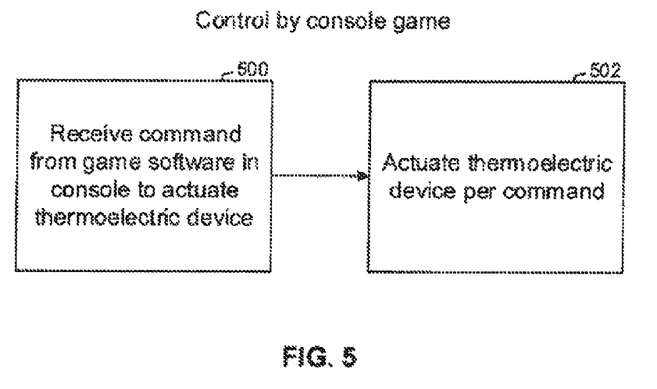
FIG. 5 is a flow chart of example logic for controlling the TED of a game controller using direct TED control commands from the game console.

FIG. 5 illustrates logic that may be executed by the processor of the game controller according to a first example. At block 500 the game controller receives from the game console a command to actuate the TED of the game controller. In this embodiment, in other words, the game console knows of TED capability in the controller and the game software executed by the game console has been programmed accordingly to issue commands to actuate the TED to heat or cool the game controller surface in coordination with presentation of the video game. The command(s) are executed at block 502.

Figure 6:
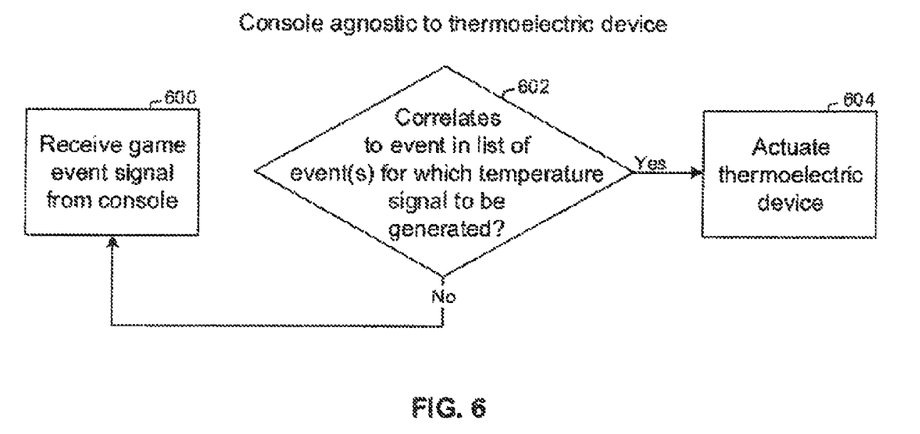
FIG. 6 is a flow chart of example logic for controlling the TED of a game controller when the game console is unaware of TED capability on the game controller.

On the other hand, the game console may be agnostic regarding whether the game controller has TED capability, in which case the logic of FIG. 6 may be employed. At block 600, a game event signal is received, either from the console or from manipulation of game control elements on the game controller. Moving to decision diamond 602, it is determined whether the game event signal correlates to an event in a list of events available to the processor of the game controller for which a temperature signal is indicated as being generated. If a correlation is found, the logic proceeds to block 604 to actuate the TED according to the temperature signal (e.g., heat up or cool down) corresponding to the event in the list of events matching the game event signal.

For example, a game event signal may be a signal from the game console indicating that the player has been shot, and the list of events may correlate such a signal to a command to input control current to the TED using a polarity that will cause the TED to cool, thereby generating a temperature-based tactile signal. Or, a game event signal may be a signal from the game console indicating that the player's weapon has been hit, and the list of events may correlate such a signal to a command to input control current to the TED using a polarity that will cause the TED to heat up, thereby generating a temperature-based tactile signal.

Yet again, a game event signal may be generated by the game controller itself in response to, e.g., a player simulating firing a rifle round using the game controller. In such an example, the list of events may correlate such a signal to a command to input control current to the TED using a polarity that will cause the TED to heat up, thereby generating a temperature-based tactile signal.

Other game events that may be used as triggers to actuate the TED include, without limitation, predetermined key manipulation sequences, predetermined button holds (pressing a controller key or button for at least a threshold period), motion sensing, or lack of any user input via the controller for at least a predetermined period (in which case the TED can be actuated to lower temperature).

Figure 7:
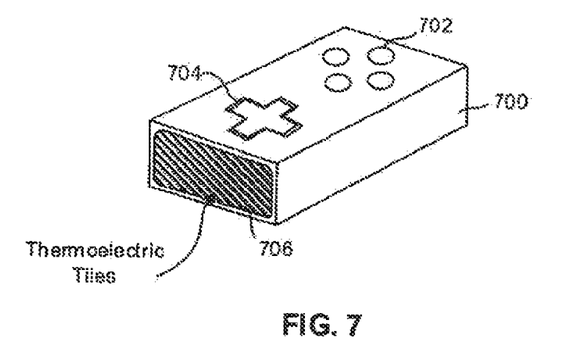
FIG. 7 is a perspective view of an example game controller.

FIG. 7 shows an example game controller 700 configured as a hand-held block-type controller with control buttons or keys 702 and a directional rocker 704. Thermoelectric device tiles 706 may be mounted on each end of the game controller 700 on the surface or just under the surface of the housing of the game controller.

Figure 8:
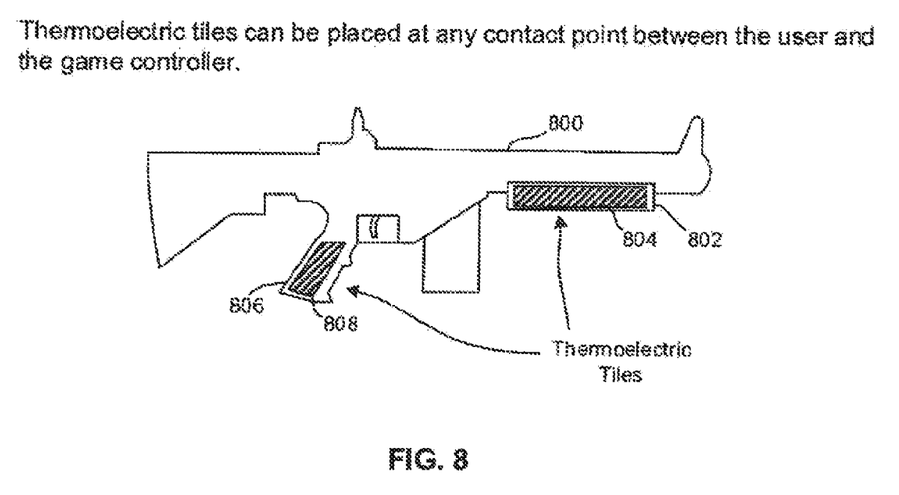
FIG. 8 is a side view of an example game controller.

FIG. 8 shows an example game controller 800 configured as a rifle with a barrel hand grip 802 onto which a TED 804 is mounted, and a handle 806 onto which a TED 808 is mounted. One or both TEDs 804, 808 may be energized to heat its respective area of the game controller 800 when the user pulls the trigger of the controller.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. At least one computer memory that is not a transitory signal and that comprises instructions executable by at least one processor to:
   receive a signal from a computer game component;
   responsive to the signal, identify that at least one thermoelectric device on at least one body-bearable game controller is to generate a tactile temperature signal on the game controller, the game controller being configured for communication with at least one game console configured to present a computer game video on a display, the thermoelectric device being energized by at least one battery; and
   charge the at least one battery using the thermoelectric device.

2. The computer memory of claim 1, wherein the signal is generated by user manipulation of at least one control element on the game controller.

3. The computer memory of claim 1, wherein the signal is received from the game console.

4. The computer memory of claim 3, wherein the signal from the game console includes a command to the game controller to actuate the thermoelectric device.

5. The computer memory of claim 3, wherein the signal from the game console is not a command to actuate the thermoelectric device, and the instructions are executable to:
   determine whether the signal correlates to at least one game event signal for which it has been determined a tactile temperature signal should be generated;
   responsive to determining that the signal is a game event signal for which it has been determined a tactile temperature signal should be generated, actuate the thermoelectric device to generate the tactile temperature signal on the game controller, and otherwise not actuate the thermoelectric device to generate the tactile temperature signal on the game controller.

6. The computer memory of claim 1, wherein the instructions are executable to:
   present on at least one display a user interface (UI) comprising at least a first selector selectable to use the thermoelectric device to charge the at least one battery connected to the thermoelectric device and at least a second selector selectable to use the thermoelectric device to generate tactile gaming signals that are temperature-based.

7. The computer memory of claim 1, wherein the tactile temperature signal is a decrease of surface temperature on at least a portion of the game controller.

8. The computer memory of claim 1, wherein the thermoelectric device is a Seebeck-Peltier thermoelectric device.

9. A game controller, comprising:
a portable housing;
at least one processor in the housing and configured to access instructions;
at least one transceiver in the housing configured for communication with at least one video game console such that user input on the game controller is sent to the video game controller to control a computer game video;
at least one thermoelectric device on the housing for at least one of: transforming heat into an electrical signal; transforming an electrical signal into heat; and
at least one battery in the housing, wherein the instructions are executable by the processor to:
present on at least one display a user interface (UI) comprising at least a first selector selectable to use the thermoelectric device to charge the at least one battery connected to the thermoelectric device and at least a second selector selectable to use the thermoelectric device to generate, using energy from the at least one battery, tactile gaming signals that are temperature-based.

10. The game controller of claim 9, wherein the thermoelectric device on the housing is configured for transforming heat into an electrical signal to charge the at least one battery in the housing.

11. The game controller of claim 9, wherein the thermoelectric device on the housing is configured for transforming an electrical signal into heat under control of the processor for generating a tactile temperature signal on the housing.

12. The game controller of claim 11, wherein the first signal is generated by user manipulation of at least one control element on the game controller.

13. The game controller of claim 11, wherein the first signal is received from the game console.

14. The game controller of claim 13, wherein the first signal from the game console includes a command to the game controller to actuate the thermoelectric device.

15. The game controller of claim 13, wherein the first signal from the game console is not a command to actuate the thermoelectric device, and the instructions are executable to:
determine whether the first signal correlates to at least one game event signal for which it has been determined a tactile temperature signal should be generated;
responsive to determining that the first signal is a game event signal for which it has been determined a tactile temperature signal should be generated, actuate the thermoelectric device to generate the tactile temperature signal on the game controller, and otherwise not actuate the thermoelectric device to generate the tactile temperature signal on the game controller.

16. The game controller of claim 9, comprising at least one computer memory with instructions executable by the at least one processor to:
receive a first signal from a computer game component; and
responsive to the first signal, identify that the thermoelectric device is to generate the tactile temperature signal.

17. A method, comprising:
receiving a first signal from a computer game component;
responsive to the first signal, actuating at least one thermoelectric device on at least one portable game controller to generate a tactile temperature signal on the game controller, the game controller being configured for communication with at least one game console configured to present a computer game video on a display;
wherein the gaming signal is received from the game console, wherein the first signal from the game console is not a command to actuate the thermoelectric device, and the method comprises determining whether the first signal correlates to at least one game event signal for which it has been determined a tactile temperature signal should be generated;
responsive to determining that the first signal is a game event signal for which it has been determined a tactile temperature signal should be generated, actuating the thermoelectric device to generate the tactile temperature signal on the game controller, and otherwise not actuating the thermoelectric device to generate the tactile temperature signal on the game controller.

18. The method of claim 17, wherein the first signal is generated by user manipulation of at least one control element on the game controller.

19. The method of claim 17, comprising causing the thermoelectric device to charge at least one battery.

20. The method of claim 19, comprising presenting on at least one display a user interface (UI) comprising at least a first selector selectable to use the thermoelectric device to charge a battery connected to the thermoelectric device and at least a second selector selectable to use the thermoelectric device to generate tactile gaming signals that are temperature-based.

* * * * *